(12) United States Patent
Burkhard et al.

(10) Patent No.: US 10,030,997 B2
(45) Date of Patent: Jul. 24, 2018

(54) CHOKE CALIBRATION, POSITION, AND/OR TIME DISPLAY

(71) Applicant: M-I LLC, Houston, TX (US)

(72) Inventors: Alan Burkhard, Florence, KY (US); Donovan Balli, Houston, TX (US)

(73) Assignee: M-I L.L.C., Houston, TX (US)

( * ) Notice: Subject to any disclaimer, the term of this patent is extended or adjusted under 35 U.S.C. 154(b) by 39 days.

(21) Appl. No.: 14/758,752

(22) PCT Filed: Dec. 31, 2013

(86) PCT No.: PCT/US2013/078558
§ 371 (c)(1),
(2) Date: Jun. 30, 2015

(87) PCT Pub. No.: WO2014/106279
PCT Pub. Date: Jul. 3, 2014

(65) Prior Publication Data
US 2015/0369630 A1     Dec. 24, 2015

Related U.S. Application Data

(60) Provisional application No. 61/747,964, filed on Dec. 31, 2012.

(51) Int. Cl.
*E21B 21/08*     (2006.01)
*G01D 5/14*     (2006.01)
(Continued)

(52) U.S. Cl.
CPC ............. *G01D 5/142* (2013.01); *E21B 21/08* (2013.01); *G06F 3/14* (2013.01); *H02K 29/08* (2013.01); *E21B 41/00* (2013.01)

(58) Field of Classification Search
CPC .......... G01D 5/142; G06F 3/14; H02K 29/08; E21B 41/00; E21B 21/08; E21B 47/06
(Continued)

(56) References Cited

U.S. PATENT DOCUMENTS 5,097,140 A * 3/1992 Crall ................. F02N 11/04
                                                                 290/31
5,222,867 A * 6/1993 Walker, Sr. ......... E21B 47/0008
                                                                 417/12
(Continued)

OTHER PUBLICATIONS

International Search Report and Written Opinion for the equivalent International patent application PCT/US2013/078558 dated May 7, 2014.
(Continued)

*Primary Examiner* — Ian Paquette
(74) *Attorney, Agent, or Firm* — David J. Smith

(57) ABSTRACT

This disclosure is generally drawn to systems, devices, apparatus, and/or methods related to choke systems for drilling environments. Specifically, the disclosed systems, devices, apparatus, and/or methods relate to choke calibration, position, and time display systems for drilling environments. In some examples, a choke display for providing choke status, position, time, and/or calibration information is provided, in some examples, an apparatus may include a circuit board having a right side and a left side, a first set of sensors disposed adjacent the right side of the circuit board, a second set of sensors disposed adjacent the left side of the circuit board, and a display portion configured to display a first mode and/or a second mode based on an actuation of the first set of sensors and an actuation of the second set of sensors.

11 Claims, 1 Drawing Sheet

(51) Int. Cl.
*H02K 29/08* (2006.01)
*G06F 3/14* (2006.01)
*E21B 41/00* (2006.01)

(58) Field of Classification Search
USPC ..................................... 175/218, 24, 38, 40
See application file for complete search history.

(56) References Cited

U.S. PATENT DOCUMENTS

| | | | |
|---|---|---|---|
| 6,867,680 B1 | 3/2005 | Kurre | |
| 7,466,788 B2 * | 12/2008 | Hoover | ................... G06M 1/00 377/15 |
| 9,546,545 B2 * | 1/2017 | Cardellini | ........... E21B 47/0006 |
| 2004/0144565 A1 | 7/2004 | Koederitz | |
| 2005/0092523 A1 * | 5/2005 | McCaskill | .............. E21B 21/08 175/38 |
| 2005/0222772 A1 | 10/2005 | Koederitz et al. | |
| 2010/0200074 A1 * | 8/2010 | Weatherbee | ........... G01B 7/003 137/13 |
| 2013/0300568 A1 * | 11/2013 | Mathena | ................... G01V 3/18 340/853.1 |

OTHER PUBLICATIONS

International Preliminary Report on Patentability for the equivalent International patent application PCT/US2013/078558 dated Jul. 9, 2015.

\* cited by examiner

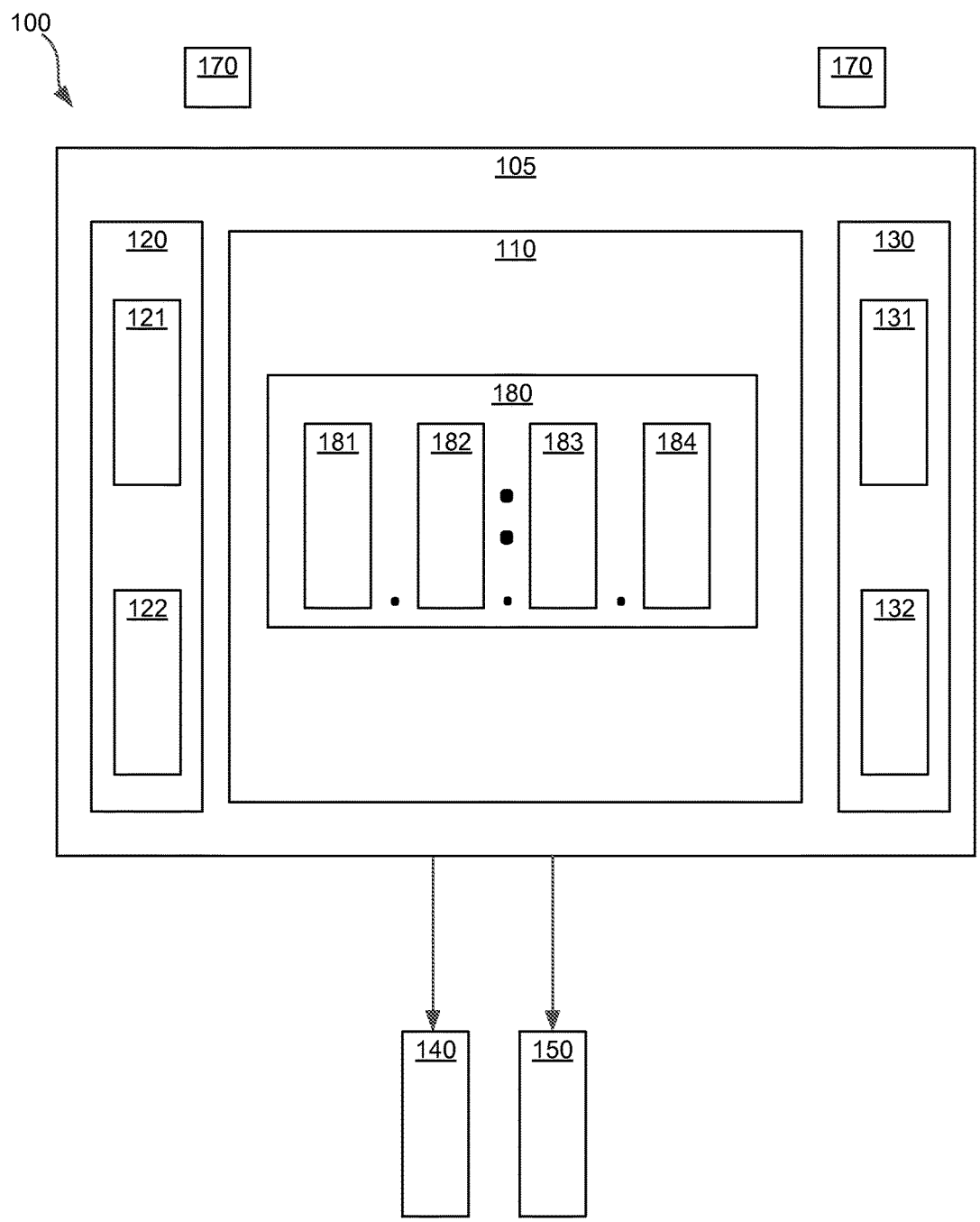

US 10,030,997 B2

CHOKE CALIBRATION, POSITION, AND/OR TIME DISPLAY

BACKGROUND

Many applications require that system pressure be controlled. In many applications, choke system(s) are implemented for pressure control. Some examples include water treatment applications, hazardous material handling applications, and drilling applications. For example, in oilfield environments, fluid pressure in oilfield activities must be carefully controlled. The present disclosure contemplates that oil drilling operations typically include a choke system to provide precise pressure control for various tasks.

The present disclosure further contemplates that some automated high-pressure oil drilling chokes may include a sliding shuttle connected to a dynamic trim sleeve. In such examples, fluid flow from a well passes through the inlet and is controlled by the action of the shuttle assembly. As the shuttle assembly slides back and forth, it adjusts the position of the dynamic trim relative to the circular orifice of the matching static trim. An increase in pressure or a decrease in the hydraulic set point pressure will cause the shuttle assembly to move away from the static trim, increasing the orifice size. This allows fluid to flow from the well and decrease the casing pressure until it equals the set point pressure. A decrease in casing pressure or an increase in the set point pressure will cause the shuttle assembly to move toward the static trim, decreasing the orifice size. This reduces the fluid flow from the well, increasing the casing pressure until it equals the set point pressure. The set point pressure applied to the backside of the shuttle assembly is adjusted by a pressure regulator and measured by the set point gauge located on the choke control panel. The annulus pressure is applied to the front side of the shuttle assembly.

Some conventional oilfield choke systems regulate casing pressure automatically under all conditions for a wide range of tasks, such as regulating mud pump start-up and/or shutdown, making and breaking drill-pipe connections, and allowing mud/gas flows alternately through the choke.

An operator of drilling operations equipment incorporating a choke system may wish to determine a status and/or the position of the choke system during operation.

BRIEF DESCRIPTION OF THE DRAWINGS

The foregoing and other features of the present disclosure will become more fully apparent from the following description, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

In the drawings:

FIG. 1 depicts a schematic representation of an example choke display; arranged in accordance with at least some of the embodiments disclosed in the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to systems, devices, apparatus, and/or methods related to choke systems for drilling environments. Specifically, the disclosed systems, devices, apparatus, and/or methods relate to choke calibration, position, and time display systems for drilling environments.

In some examples, a choke display for providing choke status, position, time, and/or calibration information is provided. In some examples, the choke display may include choke status and/or position information. In some examples, the choke display may include time meter information. In some examples, the choke display may initiate and/or display choke calibration sequence(s).

FIG. 1 depicts a schematic representation of an example choke display 100, arranged in accordance with at least some of the embodiments disclosed in the present disclosure. In some examples, a choke display 100 may include a digital display 180 (e.g., liquid crystal display) configured to display the choke opening position as a percentage (e.g., 0-100%), which may indicate how open the choke is positioned. Some example choke displays 100 may receive a signal from position sensor(s) 140 (e.g., resistance board) mounted to and/or near the choke and may then display the openness of the choke based on the signal from the position sensor(s) 140. The digital display 180 may be configured to display time information in time units (e.g., hours, fractional hours, minutes, seconds), which may be indicative of a status or the operation of the choke over a time period. Some example choke displays 100 may receive a signal from time sensor(s) 150 and may display times of certain operating conditions of the choke based on the signal from the time sensor(s) 150.

In some examples, choke displays 100 may initiate display of various modes and/or functions using external magnet(s) 170 and sensor(s) 120, 130 (e.g., Hall effect sensors 121, 122, 131, 132). In some examples, magnet(s) 170 and sensor(s) 120, 130 (e.g., Hall effect sensors 121, 122, 131, 132) may be mounted on and/or near the left and right side of the choke system display's circuit board 105.

In some examples, choke displays 100 may include position and time information modes. In some examples, magnet(s) 170 may be used to activate and/or toggle the mode of the choke display 100. To overcome certain limitations of Hall effect sensors 121, 122, 131, 132 being polarity sensitive (e.g., north pole vs. south pole), some sets of sensors may be connected in parallel and mounted on opposite sides of the choke system circuit board. In some examples, the right side of the choke system circuit board may have two Hall effect sensors 131, 132—one sensor 131 on the top for north pole detection and one sensor on the bottom 132 for south pole detection. The left side may have a similar Hall effect sensor 121, 122 configuration—one sensor 121 on the top for north pole detection and one sensor 122 on the bottom for south pole detection. Additionally, in this manner, a need for external switches or potentiometers may be eliminated or reduced.

Some example choke displays 100 may include a digital display 180 having four digits 181, 182, 183, 184 with three decimals between the digits 181, 182, 183, 184 and a colon in the middle. Some example choke displays 100 may include two switches 120, 130 (e.g., switches and/or sensors on the left and right of the display 100), where the decimals on the left and right may flash to indicate that a switch 120, 130 has been or is actuated. Some example choke displays may include a 32 kHz crystal configured to transmit a "wake up" signal to the PIC microcontroller twice a second, which may trigger display updates. Some example choke displays 100 may include several wires in a PVC cable, including, for example, a 2.5-36V battery input, a battery return, a +5V out to a sensor potentiometer, a potentiometer return, and a potentiometer signal.

In an example position information mode, the choke display 100 may include one or more of the following features while in position information mode:

May read voltage on a potentiometer and display a scaled output from the potentiometer;

Scaling may be based on a low end (e.g., 0, 0%) and a high end (e.g., 100, 100%);

May include a right switch 130 to display battery voltage for a short period (e.g., two seconds), displayed with a b as first digit (b5.48) to indicate that it's the battery reading;

May include a left switch 120 to change to the time/hour information mode;

An operator may hold (or otherwise actuate) either the right switch 130 or the left switch 120 to enable a calibration or setup mode for the position information mode, a decimal point may flash for a short period (e.g., three seconds) and then a colon may appear. The operator may then release switch 120, 130 and the colon may flash, then:

Once calibration and/or setup is enabled, the operator may press or tap (or otherwise actuate) the left switch 120 to set the low end of position of the choke, and the display 180 may change to zero (assuming a steady input); and/or Once calibration and/or setup is enabled, the operator may press or tap (or otherwise actuate) the right switch 130 to set the high end of position of the choke, and the display 180 may change to 100;

High and low ends may not relate to the input voltage (e.g., 0 can be 5V and 100 can be 0V, or vice versa);

Negative numbers may be displayed by using the middle bar of the first digit 181 on the digital display 180, so the display range may be −999 to 9999.

In an example time information mode, the choke display 100 may include one or more of the following features while in time information mode:

May count and display time periods (e.g., hours, fractional hours) from 0.000-9.999, then 10.00-99.99, then 100.0-999.9, then 1000-9999, then shows 8.8:8.8, which may remain;

Time count may occur while the input is over half-scale, but this may be adjusted during the calibration or setup mode;

May include a right switch 130 to display battery voltage for a short period (e.g., two seconds), displayed with a b as first digit (b5.48) to indicate that it's the battery reading;

May include a left switch 120 to change to the position information mode;

The operator may hold (or otherwise actuate) either the right switch 130 or the left switch 130 to enable a calibration or setup mode for the time information mode, a decimal point may flash for a short period (e.g., three seconds) and then a colon may appear. The operator may then release switch 120, 130 and the colon may flash, then;

Once calibration and/or setup is enabled, the operator may press or tap (or otherwise actuate) the left switch 120 to reset the timer, and the display 180 may change to zero; and/or Once calibration and/or setup is enabled, the operator may press or tap (or otherwise actuate) the right switch 130 to toggle between an active-high and an active-low (e.g., counting time while the input is high or low).

In some examples, information such as accumulated time and the calibration or setup settings may be stored in ferroelectric random access memory (FRAM), such that removing power from the system does not clear or remove this information from memory. In some examples, the choke display 100 may be reset to a known condition (e.g., default setup). In some examples, the choke display 100 may include a liquid crystal display 180 that may operate at low temperatures.

In some examples, a choke display 100 may also indicate and/or display water intrusion, "0" point drift as the battery depletes or with changes in temperature, narrow view angle of display, and may be certified for use in hazardous areas (e.g., NEC 500 Class 1, Div 1, ATEX Zone 1, and IECEx Zone 1). In some examples, choke displays 100 may utilize a steel housing 105 onto which a fully epoxy encapsulated circuit board 110 may be mounted. The circuit board 110 may house the display and adjustment feature (e.g., magnet(s) used to activate the "calibration" sequence) 120, 130. Some examples may be powered by an intrinsically safe barrier and/or battery pack(s).

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. An apparatus, comprising:
a circuit board having a right side and a left side;
a first set of sensors mounted near the right side of the circuit board;
a second set of sensors mounted near the left side of the circuit board;
and
a display portion disposed between the first set of sensors and the second set of sensors and configured to display at least one of a first mode and a second mode based, at least in part, on an actuation of the first set of sensors and an actuation of the second set of sensors, wherein
the first set of sensors and the second set of sensors are configured to cause the display portion to display at least one of the first mode and the second mode,
at least one set of sensors selected from the first set of sensors and the second set of sensors comprises at least one Hall effect sensor, and
the at least one Hall effect sensor toggles the display of the first mode and the second mode based on a change in a magnetic field.

2. The apparatus of claim 1, wherein the circuit board houses at least one selected from the display portion, the first set of sensors and the second set of sensors.

3. The apparatus of claim 1, wherein the display portion displays the first mode based upon an actuation of the first set of sensors.

4. The apparatus of claim 3, wherein the first mode is a position information mode.

5. The apparatus of claim 4, further comprising:
a position sensor adapted to sense a position of a choke, and adapted to transmit a position signal representative of the position of the choke to the circuit board.

6. The apparatus of claim 1, wherein the display portion displays the second mode based upon an actuation of the second set of sensors.

7. The apparatus of claim 6, wherein the second mode is a time information mode.

8. The apparatus of claim 7, further comprising:
a time sensor adapted to sense a time period associated with a choke, and adapted transmit a time signal to the circuit board.

9. An apparatus, comprising:
a controller portion configured to receive one or more position signals, and further configured to receive one or more time signals;
a display portion configured to display at least one of position information associated with the one or more position signals and time information associated with the one or more time signals; and
at least one first switch and at least one second switch configured to cause the display portion to display at least one of the position information and the time information, wherein
the display portion is disposed between the at least one first switch and the at least one second switch,
the at least one selected from the at least one first switch and at least one second switch comprises at least one Hall effect sensor, and
the at least one Hall effect sensor toggles the display of the position information and the time information based on a change in a magnetic field.

10. The apparatus of claim 9, wherein the one or more position signals comprises a voltage provided from a choke position sensor that comprises a potentiometer.

11. The apparatus of claim 9 further comprising memory for storing setup setting or accumulated time configured to retain the setup settings or the accumulated time on the memory if power is not provided to the apparatus.

\* \* \* \* \*